(12) United States Patent
Zandiyeh et al.

(10) Patent No.: US 8,064,738 B2
(45) Date of Patent: Nov. 22, 2011

(54) LEAK DETECTOR USING AN OPTICAL FIBRE

(75) Inventors: Ali Reza Kambiez Zandiyeh, Grimsby (GB); Paul Staton, Grimsby (GB)

(73) Assignee: Dunlop Oil & Marine Limited, Pyewipe, Grimsby (GB)

( * ) Notice: Subject to any disclaimer, the term of this patent is extended or adjusted under 35 U.S.C. 154(b) by 93 days.

(21) Appl. No.: 12/226,154

(22) PCT Filed: Apr. 18, 2007

(86) PCT No.: PCT/GB2007/001390
§ 371 (c)(1),
(2), (4) Date: May 1, 2009

(87) PCT Pub. No.: WO2007/119056
PCT Pub. Date: Oct. 25, 2007

(65) Prior Publication Data
US 2009/0220190 A1    Sep. 3, 2009

(30) Foreign Application Priority Data
Apr. 18, 2006 (GB) .................................. 0607572.5

(51) Int. Cl.
*G02B 6/02* (2006.01)
*G02B 6/44* (2006.01)

(52) U.S. Cl. .......................................... 385/12; 385/107
(58) Field of Classification Search ................... 385/12, 385/107
See application file for complete search history.

(56) References Cited

U.S. PATENT DOCUMENTS
5,744,794 A * 4/1998 Michie et al. ............ 250/227.16

FOREIGN PATENT DOCUMENTS
| JP | 58-095243 | 6/1983 |
| WO | WO 02/088656 | 11/2002 |
| WO | WO 03/060454 | 7/2003 |
| WO | WO 2006/038788 | 4/2006 |

OTHER PUBLICATIONS
Prel. Report on Patentab., Oct. 30, 2008, Dunlop Oil & Marine Ltd.

* cited by examiner

*Primary Examiner* — Jerry Rahll
(74) *Attorney, Agent, or Firm* — McDonald Hopkins LLC

(57) ABSTRACT

A leak detection apparatus comprising an optical fiber sensor (2) arranged to detect leakage of fluid through a hose carcass (6, 8), wherein the sensor is arranged to detect the location of the leak along a section (4) of the hose.

36 Claims, 3 Drawing Sheets

Figure 4:
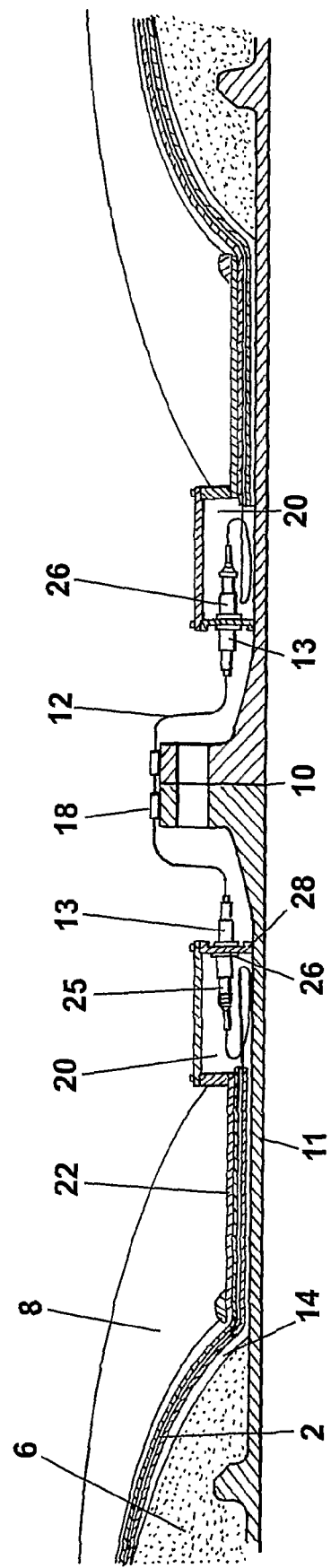

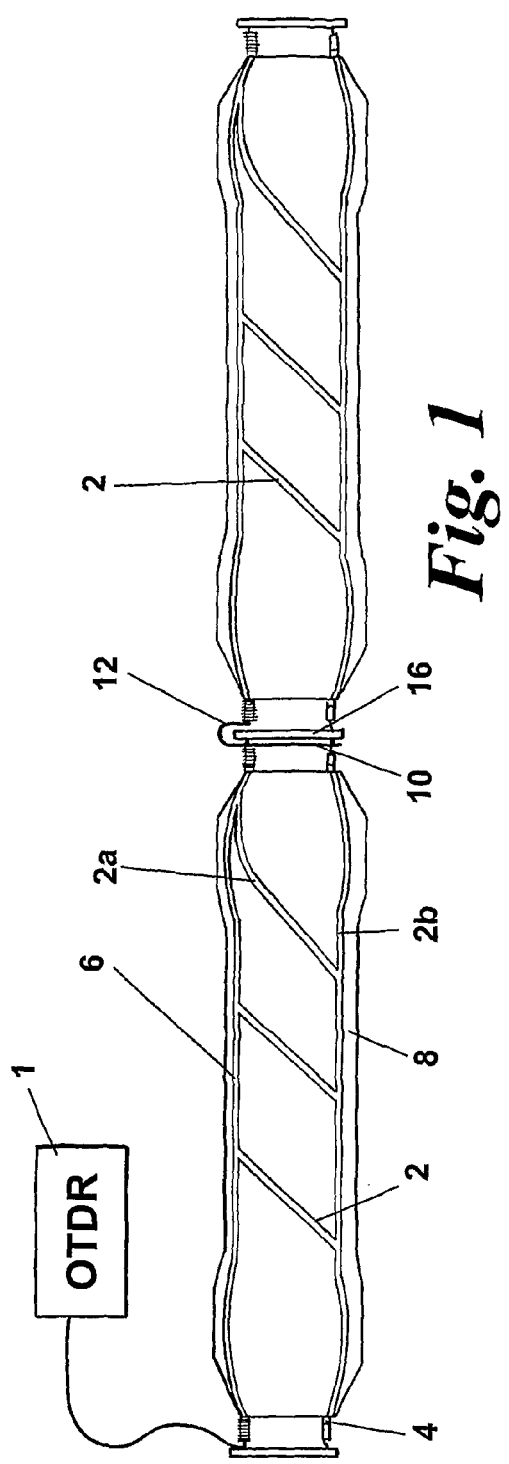
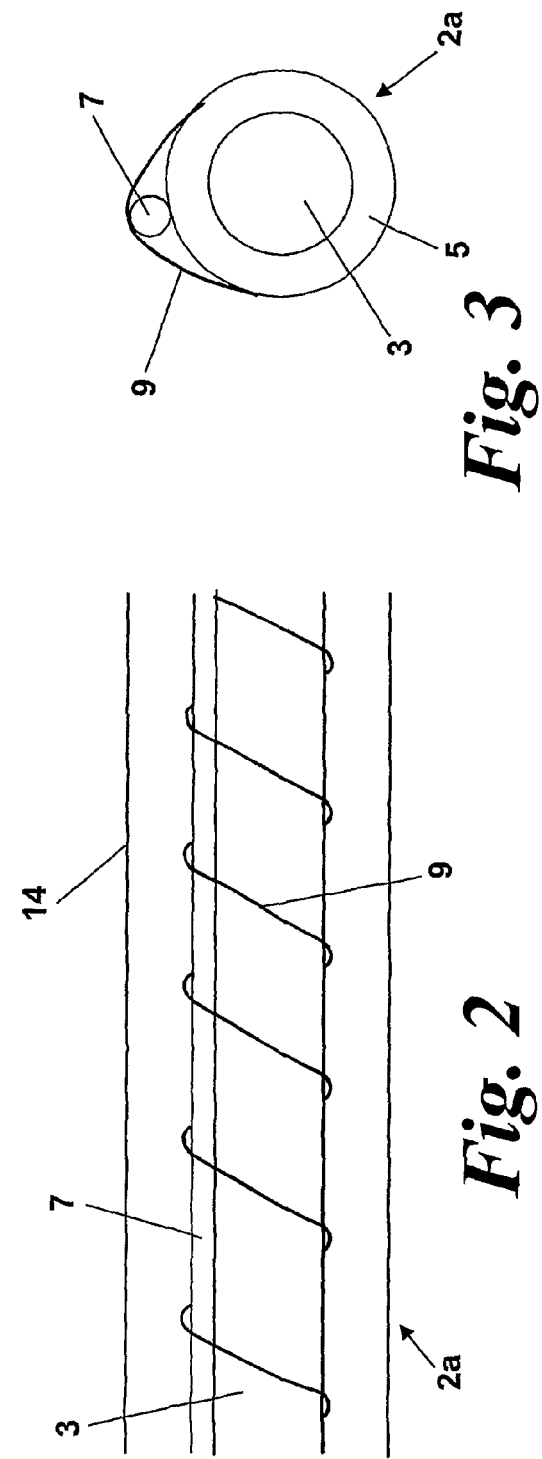

LEAK DETECTOR USING AN OPTICAL FIBRE

The present application is a U.S. National Stage Application of International Patent Application Ser. No. PCT/GB2007/001390 filed on Apr. 18, 2007, which claims priority to Great Britain Provisional Patent Application No. GB 0607572.5 filed on Apr. 18, 2006.

The present invention relates to the detection of leaks, in particular the detection of fluid leaks in a hose.

An underwater hose such as an oil hose will experience general wear and tear, ageing and may be subjected to other forms of damage. This can result in rupture of the hose causing leakage of the contents of the hose or the ingress of water from outside the hose. Generally, an underwater hose comprises an inner carcass and an outer carcass, either of which may rupture at any point along the hose. Failure of the outer carcass will result in ingress of water and failure of the inner carcass will cause leakage of fluid. Detectors are generally placed at the ends of a hose section and detect a leak once the oil from the leak reaches the end of the hose section. It is clearly beneficial to detect any leaks as soon as possible and to detect the location and type of leak.

Accordingly, the present invention provides leak detection apparatus comprising an optical fibre sensor arranged to detect leakage of fluid through a hose carcass, wherein the sensor is arranged to detect the location of the leak along a section of the hose.

The optical fibre sensor may be arranged between an inner hose carcass and an outer hose carcass and may extend along the length of the hose. Preferably, the sensor is spiralled along the length of the hose. This maximises the coverage of the leak detector. Continuous sensing along the length of the hose section allows small leaks to be detected as soon as possible before the pressure has built up to a sufficient level to force the fluid to an end of the hose section.

The apparatus may further comprise an emitter arranged to emit a light pulse into the optical fibre and a detector arranged to detect the reflected signal and to detect the location of the leak from variations in the intensity of the reflected signal over time The use of an optical detection system means that no part of the sensor has an electrical current that could come into contact with oil. There is also no requirement for a power supply within each hose section, which is a potential failure mechanism as well as a safety hazard.

The optical fibre sensor may comprise an optical fibre and a fluid sensitive material that experiences volumetric change on contact with a specific fluid. The volumetric change in the fluid sensitive material may cause microbending in the optical fibre. Preferably, the optical fibre sensor comprises a sensor core coated with the fluid sensitive material and the optical fibre may be bound onto this coated sensor core.

Preferably, the optical fibre is bound onto the fluid sensitive material by a thread such as Kevlar thread. A volumetric change in the material may force the optical fibre against the thread and may cause microbending in the fibre. Microbends in the optical fibre result in a loss of light through attenuation, reducing the intensity of the backscattered light from the point of expansion.

The fluid sensitive material may expand on contact with a hydrocarbon, and may comprise a silicone polymer. Alternatively, the fluid sensitive material may expand on contact with water and may comprise a hydrogel material. Preferably, the leak detection apparatus comprises at least two optical fibre sensors arranged to detect the leakage of different fluids.

The sensors may be housed in a protective sleeve. Preferably, the protective sleeve is permeable to allow fluid leaking through either the inner hose carcass or the outer hose carcass to come into contact with the sensor. The protective sleeve may be fixed at the ends of the hose section and may be arranged to expand with expansion of the hose section and contract with contraction of the hose section. Preferably, the sensor is free to move within the porous protective sleeve. The length of the sensor may extend beyond the length of the protective sleeve to accommodate the expansion and contraction of the hose section.

The detector apparatus may further comprise a watertight housing located at an end of the hose section, which may be arranged to contain additional length of sensor. The excess length of optical fibre sensor at the end of the hose allows for expansion and contraction of the hose. Since the sensor is free to move within the protective sleeve, additional length of sensor cable can be fed into the protective sleeve from the watertight housing if the hose expands. Similarly, excess length of sensor cable can be accommodated in the watertight housing if the hose contracts.

The detector apparatus may further comprise an optical jumper cable arranged to extend between an optical fibre sensor of the hose section and an optical fibre sensor of a second connected hose section, providing a continuous optical signal. An optical bulkhead adaptor may be arranged to provide a watertight connection between the optical fibre sensor and the optical jumper cable, and may extend through a wall of the watertight housing. Preferably, an optical bulkhead connector connects the optical fibre to the optical bulkhead adaptor and a jumper cable connector connects the optical jumper cable to the optical bulkhead adaptor.

The optical jumper cable may extend outside of the hose and may be protected by a protective cable housing. Since the optical jumper cable is situated on the outside of the hose and only extends between the watertight housings at the end of each hose, it may be easily replaced or repaired if damaged by external forces.

The apparatus may further comprise a display, arranged to display the detected signal graphically. The display may further be arranged to display a reference trace, against which the detected signal can be compared. Unexpected changes in signal can therefore be detected and used to determine the location of the leak.

According to a second aspect of the invention, there is provided a length of hose comprising an optical fibre sensor arranged to detect leakage of fluid through hose carcass.

According to a third aspect of the invention, there is provided a method of detecting a fluid leak in a hose, comprising emitting an optical signal down at least one optical fibre sensor, detecting the reflected signal and monitoring variations over time in the intensity of the reflected signal.

Figure 5:
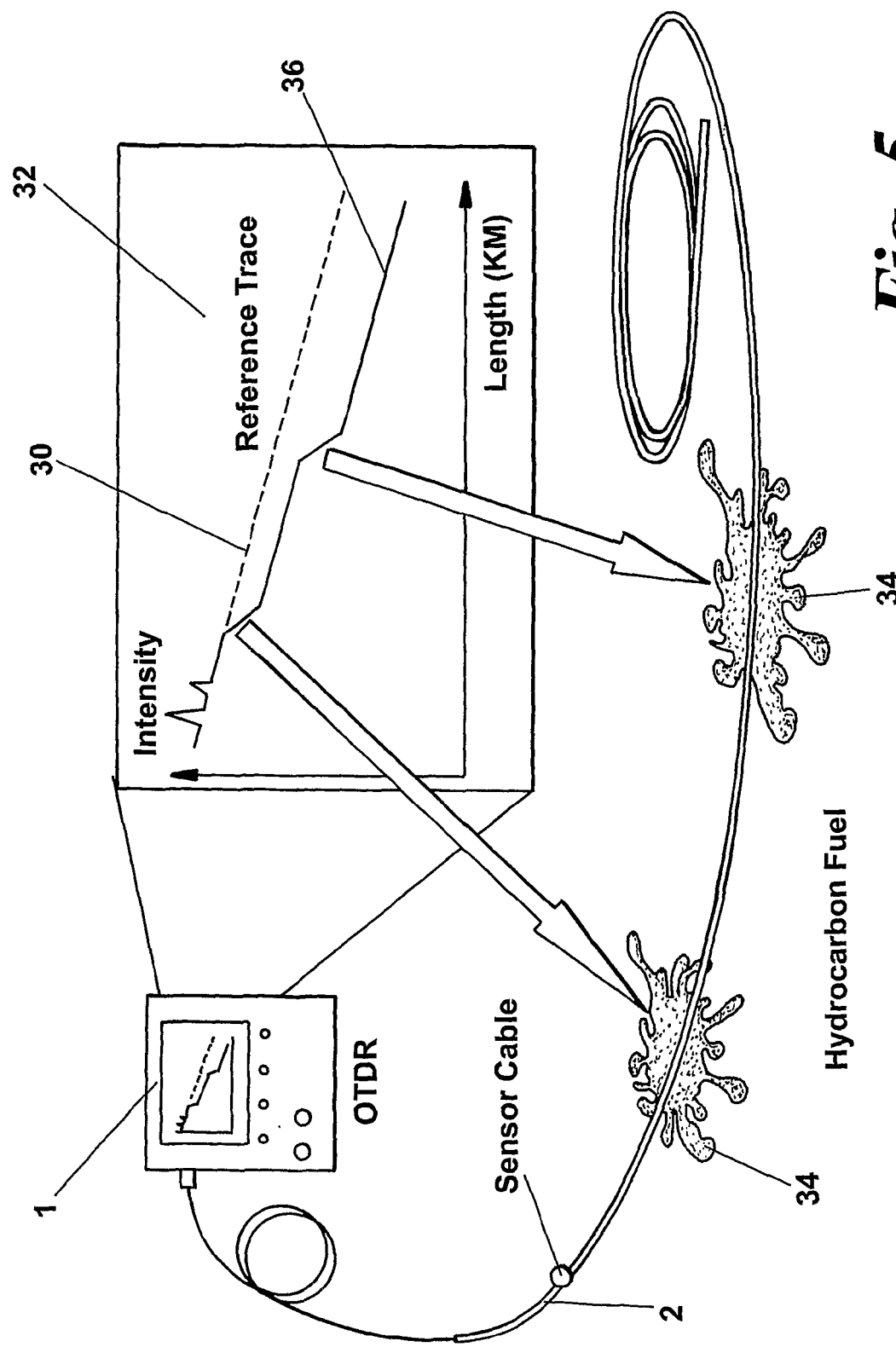

Preferred embodiments of the present invention will now be described by way of example only with reference to the accompanying drawings in which FIG. 1 schematically shows two connected hose sections and leak detection apparatus according to an embodiment of the invention;

FIG. 2 schematically shows an optical fibre sensor used in the apparatus of FIG. 1;

FIG. 3 shows a cross-section through the optical fibre sensor of FIG. 2;

FIG. 4 schematically shows a cross-section through the hose end connections of FIG. 1; and FIG. 5 is a graph with an example trace showing the detection of leaks.

Referring to FIG. 1, a leak detection system for an oil hose comprises an Optical Time Domain Reflectometry (OTDR)

unit 1 connected to optical fibre sensors 2a, 2b, which extend along the hose 4 in a spiral between an inner hose carcass 6 and an outer hose carcass 8.

Referring to FIGS. 2 and 3, the sensors 2a, 2b are of a similar construction and only one of them will be described. The sensor comprises a sensor core 3 coated with a swelling material 5 that expands on contact with either a hydrocarbon product or water. An optical fibre 7 is bound against the coated sensor core 3 by a relatively inextensible binding material, in this case a thread 9 such as Kevlar thread. The sensor is housed within a protective sleeve 14. In this embodiment, the leak detector system comprises two optical fibre sensors 2a, 2b, one 2a to detect the presence of a hydrocarbon product and one 2b to detect the presence of water.

The OTDR 1 emits a series of very short high power light pulses into the optical fibre 7. The light is internally reflected as it travels along the length of the fibre 7 and a small amount of the light is scattered back to a detector at the source 1. This data is then collected and processed by the OTDR 1. If there is a leak in either the inner hose carcass 6 or the outer hose carcass 8, oil or water will enter the space between the two layers. The oil or water passes through the porous protective sleeve 14 and contacts the optical fibre sensors 2, causing the coating 5 of one of the two sensors 2 to swell. As the swelling material 5 expands it forces the optical fibre 7 against the binding thread 9, causing localised microbending in the optical fibre 9. At these positions the conditions for total internal reflection are no longer met and light escapes from the core of the fibre 9 into the outer cladding. This light is lost through attenuation, resulting in an increase in the loss of backscattered light detected.

The sensors 2a, 2b are each wrapped around the inner hose carcass 6 in a spiral to maximise the leak detection coverage and therefore minimise the time until a leak is detected. A protective sleeve 14 surrounds each of the sensors 2a, 2b to shield them from being damaged but allows oil or water from a leak to reach the sensors 2.

The hydrocarbon sensor 2a comprises a glass reinforced polymer (GRP) sensor core 3 coated with a swelling material 5 such as a heat cured silicone polymer that expands on contact with common hydrocarbon fuels like petrol. The material 5 is extruded or alternatively dip coated onto the sensor core 5 and is applied as a thin coating of between approximately 50 microns and 100 microns. For the detection of heavier fuels and oils, other rubber compounds such as Butyl rubber and EPDM may replace the silicone. These materials 5 can be re-used to detect the same fluid again once they have fully dried out.

The optical fibre sensor 2b arranged to detect the presence of water comprises a sensor core 5 coated with a hydrogel that swells on contact with water. One example of a suitable hydrogel is a poly(ethylene oxide)-copoly(propylene oxide) (PEO/PPO) block copolymer polyurethaneurea (PUU). The ratio of the PEO to PPO alters the swelling and physical characteristics of the material. The ratios of the components are therefore chosen to provide maximum swelling on contact with water while still maintaining optimal physical strength. The hydrogel returns to a non-swollen state once it has dried and can then be re-used.

It will be appreciated that any other suitable materials that display similar physical characteristics may be used for the detection of hydrocarbons or water. The presence of other fluids may also be detected by using any suitable material that can be coated onto the sensor core 5 and that experiences a predictable volumetric change when in contact with a particular fluid.

Referring to FIGS. 1 and 4, individual hose sections 4 can be linked together to form a continuous hose by a hose connector 10, which comprises a hose end fitting 11. At a first end of the hose fitting 11, an end of the inner hose carcass 6 is sealed against the outer edge of the end fitting 11. The second end of the end fitting 11 comprises a metal flange 16, arranged to be bolted to the metal flange of an adjacent hose end fitting 11.

The protective sleeve 14 containing each of the optical fibre sensors 2a, 2b lies along the length of the hose section 4 between the inner hose carcass 6 and the outer hose carcass 8. The length of optical fibre sensor 2a, 2b is greater than the length of the hose section 4 and so additional coils of sensor extend out of the protective sleeve 14. In use, the hose experiences elongation and contraction and this additional length of sensor is arranged to accommodate this. The protective sleeve 14 is made from an extendible material and is attached at its end to the hose end fitting 11 and is fixed with respect to it. The sleeve 14 therefore expands and contracts with the hose. The protective sleeve 14 comprises a helically wound flat strip or wire and is made of metal, a sufficiently hard plastic material, or other suitable material. In its relaxed state there are gaps between each coil of the helix to allow for compression of the protective sleeve as the hose contracts. The sensors 2 are inextensible and are free to move within the protective sleeve 14. If the hose section 4 expands the additional length of sensor 2 is drawn into the protective sleeve 14 and is sufficient to extend along the length of the hose section 4. If the hose section 4, and therefore the protective sleeve 14, contracts then any excess length of sensor 2 extends beyond the end of the sleeve 14. The length of the optical fibre and hence the sensor is constant for each hose section 4 so that the distance of the leak from the OTDR unit shows which hose section 4 the leak is in and the location of the leak along that hose section 4.

A watertight box housing 20 is attached to the hose end fitting 11 and is fixed with respect to it. An opening 22 to the box housing 20 is connected to the gap between the inner 6 and outer 8 hose carcasses and is sealed from the outside by the outer hose carcass 8. The protective sleeve 14 extends into the opening 22 of the watertight box housing 20 and is fixed with respect to it. Excess coils of each sensor 2a, 2b extend out of the end of the protective sleeve 14 and are accommodated in the watertight box housing 20.

The watertight housing 20 further comprises a watertight optical bulkhead adaptor 26 mounted in the end wall 28 of the housing 20. An optical bulkhead connector 25 is provided at the end of the optical fibre sensors 2a, 2b and arranged to attach the optical fibre sensor to the bulkhead adaptor 26. An optical jumper cable 12 is also provided, which extends between each of the optical fibre sensors 2a, 2b of two adjacent hose sections 4. Jumper cable connectors 13 at each end of the optical jumper cable 12 are arranged to connect the cable 12 to the optical bulkhead adaptor 26 of adjacent hose sections 4, providing a continuous optical signal from hose section to hose section. The optical jumper cable 12 passes around the outside of the hose connector 10 and is protected by a rugged cable housing 18 over the exposed flange areas. If external forces damage the jumper cable 12, the connectors 13 enable the cable to be easily disconnected and replaced.

Referring to FIG. 5, the level of detected backscattered light can be displayed as a plot of intensity against distance along the fibre. The timing of emitted pulses of light is known and the level of backscattered light for a given time after a pulse is emitted is recorded. The distance travelled by the signal down the optical fibre 7 in any given time is known and so the intensity of backscattered light can be displayed as a function of distance down the length of the fibre. There is an inherent loss of light intensity in any normal optical fibre and typically an optical fibre exhibits similar loss characteristics along its entire length. A plot of the intensity of backscattered light as a function of distance along the fibre for a normal fibre is therefore linear with a negative gradient. This is displayed as a reference trace 30 on the screen 32.

A leak 34 in the hose 4 causes an increase in the loss of light at the location along the optical fibre 7 of the leak 34, as discussed above. This therefore results in a greater than expected decrease in the level of backscattered light from that location. The detected signal 36 is displayed on the screen 32 and compared with the reference trace 30 to determine if a leak has occurred. An unexpected drop in intensity compared to the intensity of the reference trace 30 at the same location indicates the presence of a leak at that location. Therefore the position of the leak along the hose can be detected.

Since the length of the optical fibre associated with each hose section is constant, when a hose is made up of a number of hose sections, with the sensors connected together as described to form a single sensor extending along substantially the whole length of the hose, the distance along the hose of a detected leak can be determined. From this the hose section in which the leak has occurred can be identified. Also the position along that hose section at which the leak has occurred can also be determined, to an accuracy that depends on the OTDR unit.

To avoid the need to observe the displayed signal, a differential trace is taken to detect differences between the reference trace 30 and the detected signal 36. A threshold value is set and any difference between the two signals that exceeds the threshold value activates an alarm, alerting an operator to the possible presence of a leak. The position of the leak 34 is recorded as distance along the length of the hose, or alternatively is displayed on a schematic map of the monitored hose length.

It will be appreciated that the leak detector of the described embodiment may be adapted to detect the presence of fluids other than hydrocarbon products and water and that additional sensors may be included in the detector to facilitate the detection of more than two different fluids. It will also be appreciated that an operator may be alerted to the presence of a leak in a number of different ways. For example, an alarm may sound at the site of the detector, or alternatively a signal may be sent to a remote device.

The invention claimed is:

1. Leak detection apparatus for detecting a leak in a section of hose, the section of hose having a hose carcass and a first end, the leak having a location along the section of hose, the apparatus comprising:
   at least one watertight housing located at the first end of the section of hose, the watertight housing having a first wall; and
   an optical fibre sensor having a first end, the optical fibre sensor being arranged to detect leakage of fluid through the hose carcass and to detect the location of the leak, the first end of the optical fibre sensor being contained in said at least one watertight housing;
   an optical jumper cable arranged to extend between said first end of the optical fibre sensor and a further optical fibre sensor of a second connected hose section to provide optical continuity; and
   an optical bulkhead adaptor arranged to provide a watertight connection between said optical fibre sensor and the optical jumper cable, wherein the optical bulkhead adaptor extends through said first wall of the watertight housing.

2. Apparatus according to claim 1, further comprising an optical bulkhead connector arranged to connect the optical fibre sensor to the optical bulkhead adaptor and a jumper cable connector arranged to connect the optical jumper cable to the optical bulkhead adaptor.

3. Apparatus according to claim 1, further comprising a protective cable housing wherein the optical jumper cable is protected by the protective cable housing.

4. A length of hose including a section of hose, the section of hose having a hose carcass and a first end, and leak detection apparatus for detecting a leak in the section of hose according to claim 1.

5. Leak detection apparatus for detecting a leak in a section of hose, the section of hose having a carcass, the leak having a location along the section of hose, the apparatus comprising an optical fibre sensor arranged to detect leakage of fluid comprising a hydrocarbon through the hose carcass and to detect the location of the leak, wherein the optical fibre sensor comprises a fluid sensitive material that experiences volumetric change on contact with the hydrocarbon.

6. Apparatus according to claim 5, wherein the section of hose has an inner hose carcass and on outer hose carcass, and the optical fibre sensor is arranged between the inner hose carcass and the outer hose carcass.

7. Apparatus according to claim 1, wherein the optical fibre sensor includes an optical fibre, and a volumetric change in the fluid sensitive material is arranged to cause bending in the optical fibre.

8. Apparatus according to claim 7, wherein the optical fibre sensor comprises a sensor core including the fluid sensitive material and wherein the optical fibre is bound onto the sensor core.

9. Apparatus according to claim 7, wherein the optical fibre is bound onto the fluid sensitive material by a thread and wherein a volumetric change in the material forces the optical fibre against the thread causing microbending in the fibre.

10. Apparatus according to claim 5, wherein the optical fibre sensor extends along the length of the hose.

11. Apparatus according to claim 10, wherein the sensor is spiralled along the length of the hose.

12. Apparatus according to claim 5, wherein the fluid sensitive material is a silicone polymer.

13. Apparatus according to claim 5, comprising an additional optical fibre sensor, wherein the additional optical fibre sensor is arranged to detect the leakage of water through the carcass and to detect the location of the leak, wherein the additional optical fibre sensor comprises a second fluid sensitive material that experiences volumetric change on contact with water.

14. Apparatus according to claim 13, wherein the second fluid sensitive material is a hydrogel.

15. Apparatus according to claim 5, wherein the sensor is housed in a protective sleeve.

16. Apparatus according to claim 15, wherein the protective sleeve has ends, and the hose section has ends, and the ends of the protective sleeve are fixed at the ends of the hose section.

17. Apparatus according to claim 15, wherein the protective sleeve is arranged to expand with expansion of the hose section.

18. Apparatus according to claim 15, wherein the protective sleeve is arranged to contract with contraction of the hose section.

19. Apparatus according to claim 15, wherein the sensor is free to move within the protective sleeve, the protective sleeve has an end, and the sensor extends beyond the end of the protective sleeve to accommodate any change in hose section length.

20. Apparatus according to claim 5, wherein the hose section has an end, the apparatus further comprising a watertight housing located at the end of the hose section.

21. Apparatus according to claim 20, wherein the optical fibre sensor has an end, and the end of the optical fibre sensor is contained within the watertight housing.

22. Apparatus according to claim 20, wherein the optical fibre sensor includes additional length of optical fibre arranged to accommodate change in the length of the hose section, and the watertight housing contains the additional length of optical fibre.

23. Apparatus according to claim 5, further comprising an optical jumper cable arranged to extend between the optical fibre sensor of the hose section and an optical fibre sensor of a second connected hose section to provide optical continuity.

24. Apparatus according to claim 23, further comprising an optical bulkhead adaptor arranged to provide a watertight connection between the optical fibre sensor and the optical jumper cable.

25. Apparatus according to claim 24, further comprising a watertight housing having a wall wherein the optical bulkhead adaptor extends through the wall of the watertight housing.

26. A length of hose including a section of hose, the section of hose having a hose carcass and a first end, and a leak detection apparatus for detecting a leak in the section of hose according to claim 5.

27. Apparatus according to claim 5, wherein the optical fibre sensor comprises an optical fibre and an emitter arranged to emit a light pulse into the optical fibre and a detector arranged to detect a reflected signal and to record variations in the intensity of the reflected signal over time.

28. Apparatus according to claim 27, further comprising a display arranged to display the detected signal graphically.

29. Apparatus according to claim 28, wherein the display is further arranged to display a reference trace.

30. Leak detection apparatus for detecting a leak in a section of hose, the section of hose having a hose carcass and first and second ends, the leak having a location along the section of hose, the apparatus comprising:

an optical fibre sensor arranged to detect leakage of fluid through the hose carcass and to detect the location of the leak; and
a protective sleeve comprising a strip of metal or plastic, the strip being helically wound around the optical fibre sensor;
wherein the protective sleeve and the optical fibre sensor extend, in use, between the first and second ends of the section of hose, next to the hose carcass.

31. A length of hose including a section of hose, the section of hose having a hose carcass and a first end, and leak detection apparatus for detecting a leak in the section of hose according to claim 30.

32. Apparatus according to claim 30, wherein the protective sleeve has first and second ends, the first and second ends of the protective sleeve being fixed, in use, at the first and second ends of the hose section respectively.

33. Apparatus according to claim 30, wherein the protective sleeve is arranged to do at least one of: expand when the hose section expands; and contract when the hose section contracts.

34. Apparatus according to claim 30, wherein the sensor is movably housed within the protective sleeve and extends beyond at least one of the ends of the protective sleeve to accommodate a change in length of the hose section.

35. Leak detection apparatus for detecting a leak in a section of hose, the section of hose having a hose carcass and a first end, the leak having a location along the section of hose, the apparatus comprising:

at least one watertight housing located at the first end of the section of hose; and
an optical fibre sensor having a first end, the optical fibre sensor being arranged to detect leakage of fluid through the hose carcass and to detect the location of the leak, the first end of the optical fibre sensor being contained in said at least one watertight housing;
wherein said at least one watertight housing contains an additional length of the optical fibre sensor, the additional length of the optical fibre sensor being arranged to accommodate a change in length of the hose section.

36. A length of hose including a section of hose, the section of hose having a hose carcass and a first end, and leak detection apparatus for detecting a leak in the section of hose according to claim 35.

* * * * *